United States Patent
Choi et al.

(10) Patent No.: US 7,303,323 B2
(45) Date of Patent: Dec. 4, 2007

(54) BACKLIGHT ASSEMBLY OF LIQUID CRYSTAL DISPLAY

(75) Inventors: Yun Ho Choi, Yongdungpo-gu (KR); Chang Jong Kim, Chungjoo-si (KR); Young Gun Kim, Chungjoo-si (KR); Sang Gon Lee, Daegu-si (KR); Ung Sang Lee, Chungjoo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/949,243

(22) Filed: Sep. 27, 2004

(65) Prior Publication Data
US 2005/0099823 A1    May 12, 2005

(30) Foreign Application Priority Data
Nov. 12, 2003    (KR)    ............ 10-2003-0079740

(51) Int. Cl.
*F21V 7/04* (2006.01)
(52) U.S. Cl. ............. 362/606; 362/614; 362/620; 362/339
(58) Field of Classification Search ............. 362/607, 362/606, 614, 620, 626, 330, 331, 332, 335, 362/339; 349/62–65
See application file for complete search history.

(56) References Cited

U.S. PATENT DOCUMENTS

| | | | |
|---|---|---|---|
| 2,248,638 A | 7/1941 | Merton | |
| 4,542,449 A | 9/1985 | Whitehead | |
| 4,906,070 A | 3/1990 | Cobb, Jr. | |
| 5,056,892 A | 10/1991 | Cobb, Jr. | |
| 5,394,255 A * | 2/1995 | Yokota et al. | ............ 349/64 |
| 5,592,332 A * | 1/1997 | Nishio et al. | ............ 359/619 |
| 5,838,403 A * | 11/1998 | Jannson et al. | ............ 349/65 |
| 5,844,720 A * | 12/1998 | Ohara et al. | ............ 359/599 |
| 6,002,829 A * | 12/1999 | Winston et al. | ............ 385/146 |
| 6,151,169 A | 11/2000 | Kim | |
| 2003/0038916 A1* | 2/2003 | Nakano et al. | ............ 349/158 |

FOREIGN PATENT DOCUMENTS

| CN | 1212042 A | 3/1999 |
|---|---|---|
| WO | WO 03/040784 A1 | 5/2003 |

* cited by examiner

*Primary Examiner*—Sandra O'Shea
*Assistant Examiner*—Gunyoung T. Lee
(74) *Attorney, Agent, or Firm*—McKenna Long & Aldridge LLP (57) ABSTRACT

A backlight assembly of an LCD is provided. The backlight assembly includes a lamp for generating a light, a light guide plate disposed at a side of the lamp, for guiding the light, and a diffusion sheet and a prism sheet disposed on the light guide plate, for enhancing efficiency of the light outputted from the light guide plate, wherein the prism sheet comprises a body part and a plurality of protrusion parts each having a concavely inclined surface formed on the body part.

17 Claims, 7 Drawing Sheets

BACKLIGHT ASSEMBLY OF LIQUID CRYSTAL DISPLAY

This application claims the benefit of Korean Patent Application No. 2003-79740, filed in Korea on Nov. 12, 2003, which is hereby incorporated by reference for all purposes as if fully set forth herein.

BACKGROUND OF THE INVENTION

1. Field of the Invention

The present invention relates to a non-luminous flat display device, and more particularly, to a backlight assembly of a liquid crystal display with an improved optical sheet.

2. Description of the Related Art

Recently, a variety of flat panel displays have been developed to reduce weight and volume acting as drawbacks of cathode ray tubes (CRTs). Such flat panel displays include a liquid crystal display (LCD), a field emission display, a plasma display panel (PDP), an electro-luminescence (EL) and the like. Research for enhancing the display quality and increasing the screen size of the flat panel displays is being actively performed.

Among such flat panel displays, LCDs have several advantages including slimness, light weight, low power consumption characteristics. In particular, the LCD displays information using electrical and optical properties of liquid crystal molecules. The LCD itself is a non-luminous device that displays images using a light source such as a lamp. In other words, unlike in the CRT, the LCD essentially needs a separate unit for irradiating light, i.e., a backlight assembly because the liquid crystal molecules injected between a thin film transistor (TFT) substrate and a color filter substrate does not emit light on their own.

In general, a backlight assembly includes a mold frame having a receiving space, a reflector mounted on the lowest surface of the receiving space for reflecting light toward liquid crystal display panel, a light guide plate disposed on the reflector for guiding light, a lamp unit disposed between the light guide plate and a sidewall of the receiving space for emitting light, optical sheets stacked on the light guide plate for diffusing and focusing light, and a top chassis disposed on the mold frame and enclosing the liquid crystal display from a predetermined portion of the edge of the liquid crystal display panel to a side portion of the mold frame.

The optical sheets include a diffusion sheet for diffusing light, a prism sheet disposed on the diffusion sheet for focusing the diffused light and transferring the focused light to the liquid crystal display panel, and a protection sheet for protecting the diffusion sheet and the prism sheet.

Figure 1:
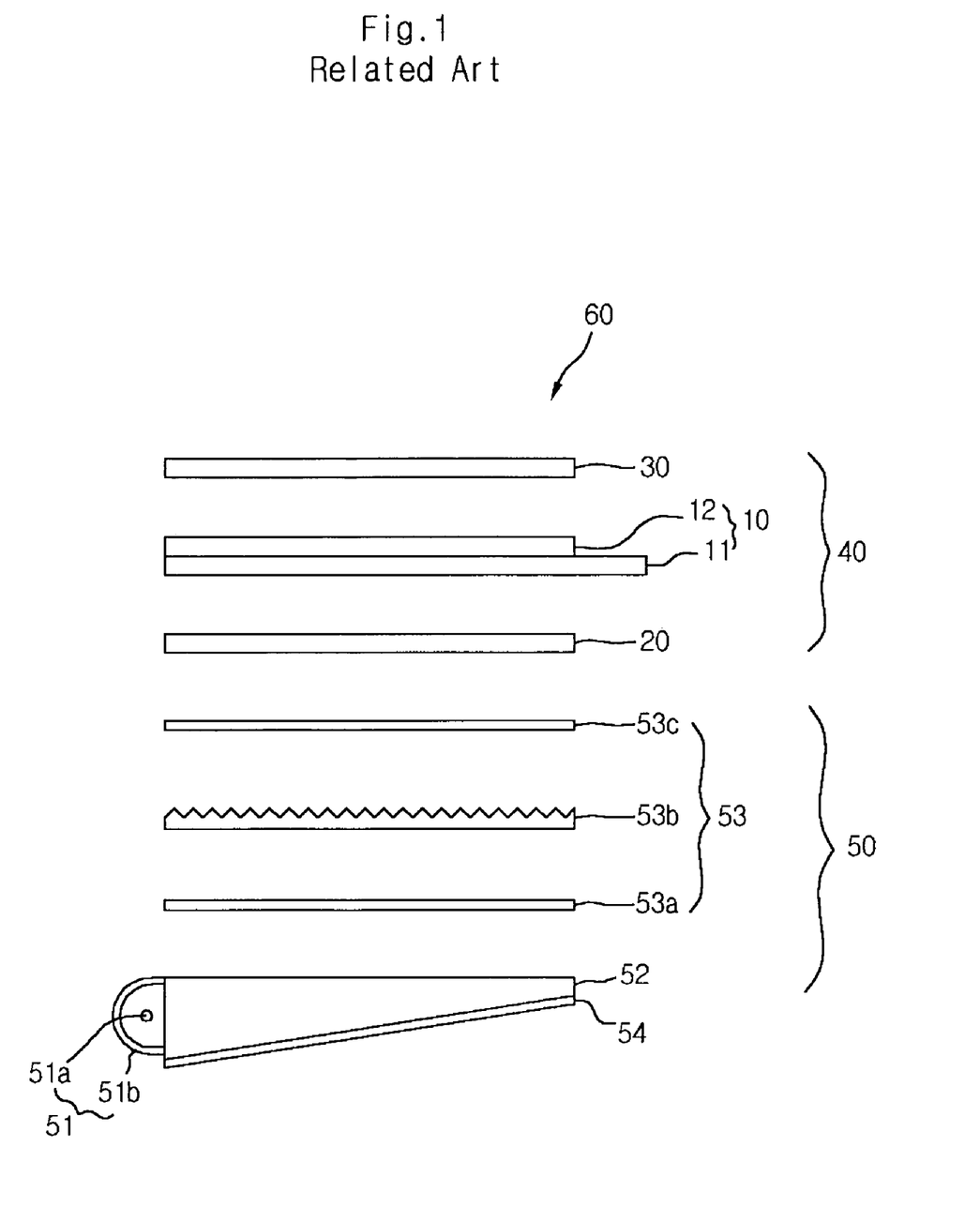
FIG. 1 is a sectional view of a related art LCD.

FIG. 1 is a sectional view of a related art LCD.

Referring to FIG. 1, the related art LCD includes a backlight assembly 50 for generating light, and a display unit 40, which receives the light from the backlight assembly 50 and displays images. The backlight assembly 50 includes a lamp unit 51 for generating light and a light guide unit for guiding the light generated by the lamp unit 51 toward a liquid crystal display panel 10.

The display unit 40 includes the liquid crystal display panel 10 and an upper polarizer 30 and a lower polarizer 20 respectively disposed on an upper surface and a lower surface of the liquid crystal display panel 10. The liquid crystal display panel 10 includes a TFT substrate 11 and a color filter substrate 12 each having an electrode formed thereon.

Specifically, the lamp unit 51 includes a lamp 51a for generating light and a lamp reflector 51b enclosing the lamp 51a. The light generated by the lamp 51a is incident into a light guide plate 52 to be described later. The lamp reflector 51b reflects the light generated by the lamp 51a toward the light guide plate 52, thereby increasing amount of incident light toward the light guide plate 52.

The light guide unit includes a reflection plate 54, the light guide plate 52, and optical sheets 53. The light guide plate 52 is disposed at one end of the lamp unit 51 to guide the light emitted from the lamp unit 51 such that the light emitted from the lamp unit 51 is incident into the LCD panel 10.

The reflection plate 54 is disposed beneath the light guide plate 52 and reflects light leaked from the light guide plate 52 toward the light guide plate 52 again.

The plurality of optical sheets 53 are disposed on the light guide plate 52 to enhance efficiency of the light passing through the light guide plate 52. Specifically, the optical sheets 53 include a diffusion sheet 53a, a prism sheet 53b and a protection sheet 53c, and are orderly stacked on the light guide plate 52.

The diffusion sheet 53a scatters the light that is incident from the light guide plate 52, thereby making the brightness distribution of the light uniform. The prism sheet 53b includes a plurality of prisms formed repeatedly on an upper surface thereof and focuses the light diffused by the diffusion sheet 53a in a direction perpendicular to a plane of the LCD panel 10. Accordingly, the light that has passed through the prism sheet 53b mostly advances in a direction perpendicular to the plane of the LCD panel 10, thereby obtaining a uniform distribution.

The protection sheet 53c provided on the prism sheet 53b functions not only to protect the upper surface of the prism sheet 53b, but also to diffuse light so as to make the distribution of the light that is incident from the prism sheet 53b uniform.

Figure 2A:
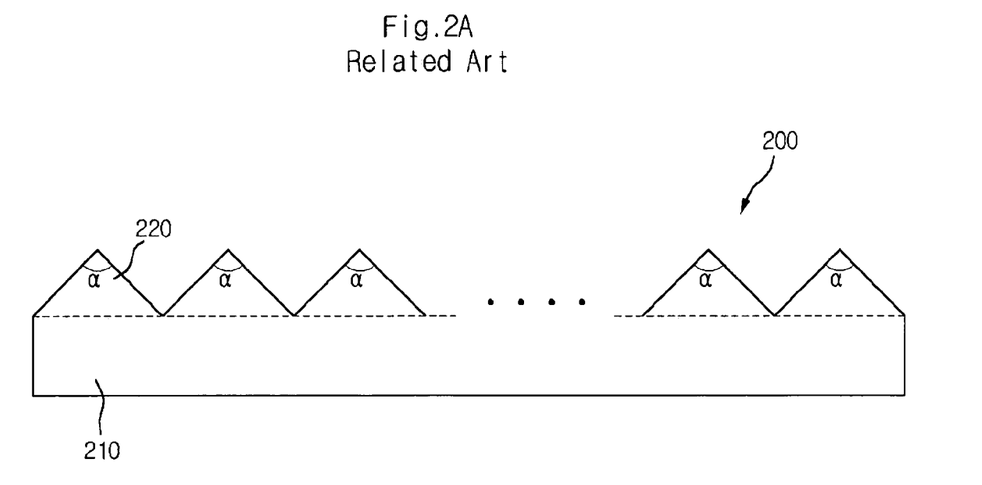
FIGS. 2A and 2B are a sectional view and a perspective view of the prism sheet illustrated in FIG. 1 respectively.
Figure 2B:
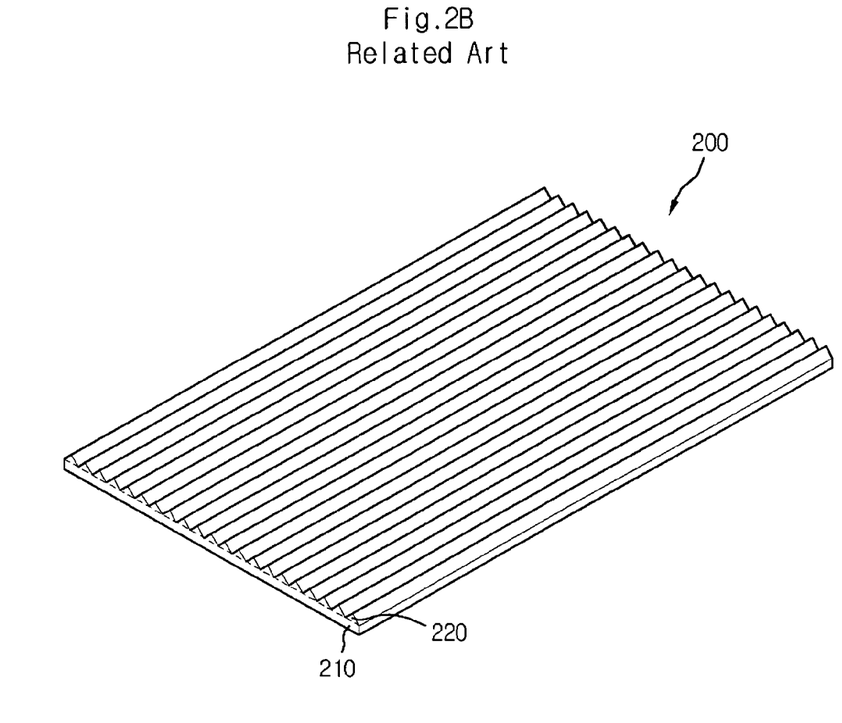

FIGS. 2A and 2B are a sectional view and a perspective view of the prism sheet illustrated in FIG. 1 respectively.

Referring to FIGS. 2A and 2B, the related art prism sheet 200 includes a body part 210, through which the light diffused by the light guide plate and the diffusion sheet is initially introduced, and a protrusion part 220 shaped in a isosceles triangle prism, for maintaining path of the diffused light constantly. The protrusion part 220 has a plurality of isosceles triangle prisms linearly arranged in a stripe form.

The protrusion part 220 shaped in the isosceles triangle prism has a pitch ranging from a few tens μm to a few hundreds μm, and an apex angle α ranging from 60 degrees to 130 degrees. When the apex angle α is an acute angle, the brightness increases but the viewing angle decreases.

Also, when the protrusion part 220 of the isosceles triangle prism is installed directing toward the front side of the LCD panel, the prism sheet 200 focuses the diffused light introduced into the body part 210 by refracting the diffused light toward the front side, but the light that is introduced into inclined surfaces of the protrusion part 220 does not contribute to the enhancement of the front brightness and is lost due to the inner full reflection.

To overcome this drawback, the prism sheet may be arranged such that the protrusion part 220 is directed toward the light guide plate. However, such an arrangement enhances the front brightness, but decreases the viewing angle, which is counter to use in the flat panel displays requiring a wide viewing angle, such as a home television.

SUMMARY OF THE INVENTION

Accordingly, the present invention is directed to a backlight assembly of an LCD that substantially obviates one or more problems due to limitations and disadvantages of the related art.

An advantage of the present invention is to provide a backlight assembly with an improved prism sheet, the prism sheet having a plurality of protrusion parts formed on one side thereof with a concavely inclined surface.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

These objectives and other advantage of the invention may be realized and attained by the structure particularly pointed out in the written description and claims hereof as well as the appended drawings.

To achieve these and other advantages and in accordance with the purpose of the invention, as embodied and broadly described herein, there is provided a backlight assembly of an LCD, comprising: a lamp for generating a light; a light guide plate disposed at a side of the lamp, for guiding the light; and a diffusion sheet and a prism sheet disposed on the light guide plate, for enhancing efficiency of the light outputted from the light guide plate, wherein the prism sheet comprises a body part and a plurality of protrusion parts each having a concavely inclined surface formed on the body part.

The inclined surface of each of the protrusion parts may be a circular arc surface formed when two circular cylinders having an identical radius 'r' overlap with each other, and an apex point 'a' of the each of the protrusion parts is one of two contact points of the two circular cylinders overlapping with each other, which is equal to or is leveled lower than a position of a center 'O' of a section of the circular cylinder.

The plurality of protrusion parts may extend from one end of the body part to the other end of the body part opposing the one end of the body part and are formed linearly in parallel with one another.

The prism sheet may be formed of a transparent resin material. The transparent resin material is acryl or polycarbonate.

An angle 'θ' between a first line parallel to a plane of the body part and a second line connecting a center 'O' of any of the two circular cylinders with the apex point 'a' of the protrusion part has a relationship of $0° \leq \theta < 90°$. A distance between the adjacent apex points of the protrusion parts is equal to or less than (cos θ+1) times as much as the radius of any of the two circular cylinders.

The protrusion may have a height less than 300 μm. The backlight assembly may further include a retreating sheet disposed on the prism sheet, for retreating the light that is incident from the prism sheet.

The prism sheet may be disposed such that the protrusion part faces the diffusion sheet. Or, the prism sheet may be disposed such that the body part faces the diffusion sheet.

The prism sheet may include two prism sheets each having the protrusion part, which is disposed with an angle ranging from 0 degree to 90 degrees.

In another aspect of the present invention, there is provided a backlight assembly of an LCD, comprising: a lamp for generating a light; a light guide plate disposed at a side of the lamp, for guiding the light; and a diffusion sheet disposed on the light guide plate, for scattering the light that is incident from the light guide plate to make brightness distribution of the light uniform; a prism sheet disposed on the diffusion sheet and having a plurality of protrusion parts having a concavely inclined surface and arranged in a stripe form; and a retreating sheet disposed on the prism sheet, for retreating the light that is incident from the prism sheet.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATED EMBODIMENTS

Reference will now be made in detail to embodiments of the present invention, examples of which are illustrated in the accompanying drawings.

Figure 3A:
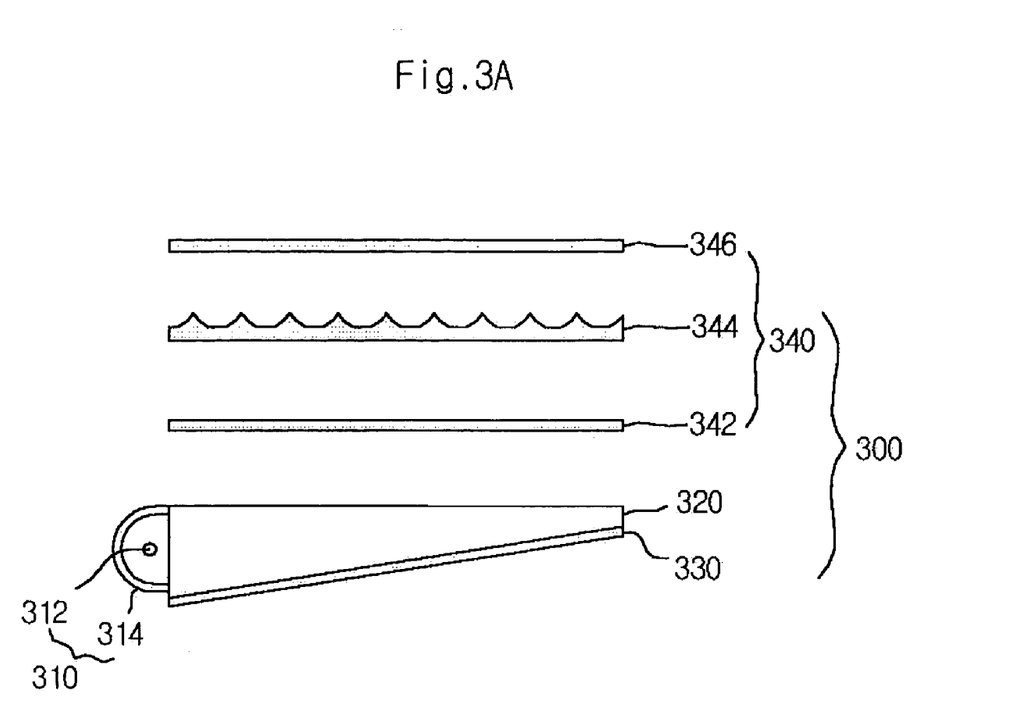
FIGS. 3A, 3B and 3C are sectional views of backlight assemblies of an LCD according to the present invention.
Figure 3B:
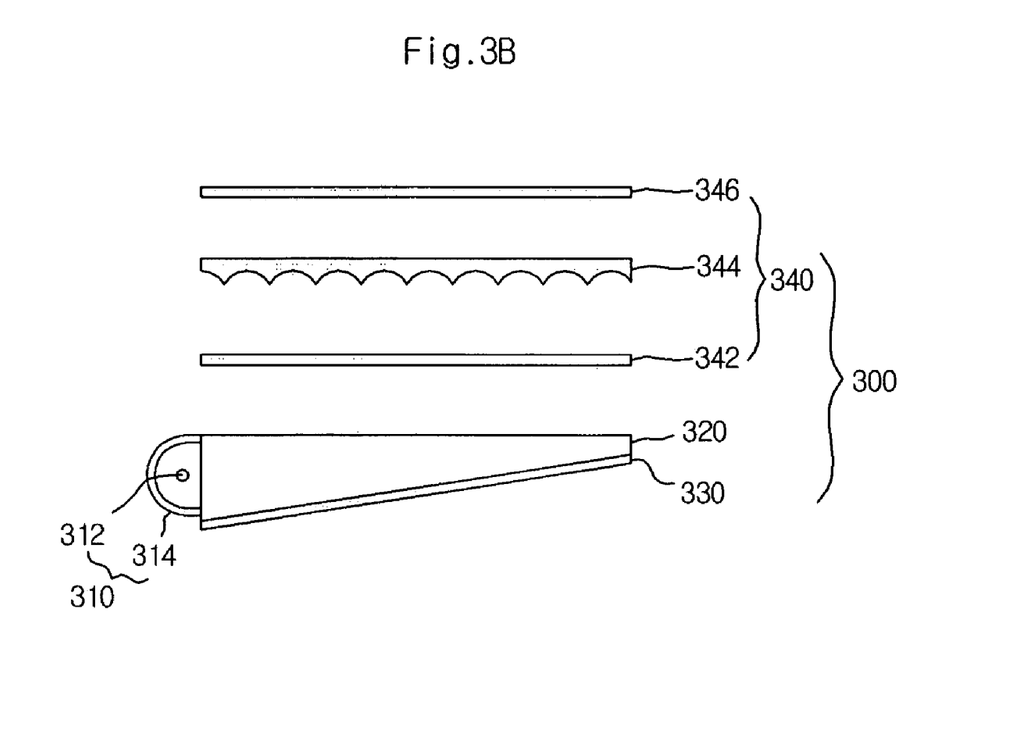
Figure 3C:
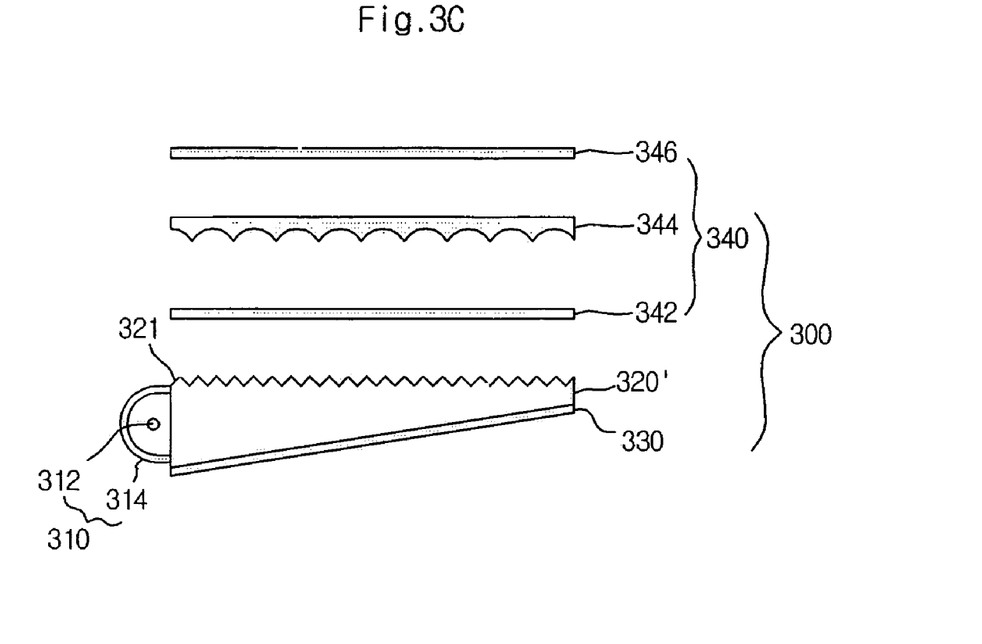

FIGS. 3A, 3B and 3C are sectional views of backlight assemblies of an LCD according to the present invention. Referring to FIGS. 3A and 3B, each of the backlight assemblies 300 includes a lamp unit 310 for generating light and a light guide unit for guiding the light generated by the lamp unit 310 toward a liquid crystal display panel.

In the present invention, it is noted that among optical sheets 340 provided in the light guide unit, a prism sheet is formed of a transparent resin material such as acryl, polycarbonate or the like, and has a plurality of protrusion parts arranged in a stripe form, i.e., in a linear form, each of the protrusion parts having a concavely inclined surface formed on one surface thereof.

The inclined surface of each of the protrusion parts formed on an upper surface of the prism sheet is a substantially circular arc surface formed when two circular cylinders having an equal radius 'r' overlap with each other, and apex point 'a' of the each of the protrusion parts is one of two contact points of the two circular cylinders overlapping with each other, and is located equal to or lower than center 'O' of a cross section of the circular cylinder.

In the above, the circular cylinders are introduced so as to design the shape of the protrusion parts and are not provided on the actual prism sheet.

Figure 4:
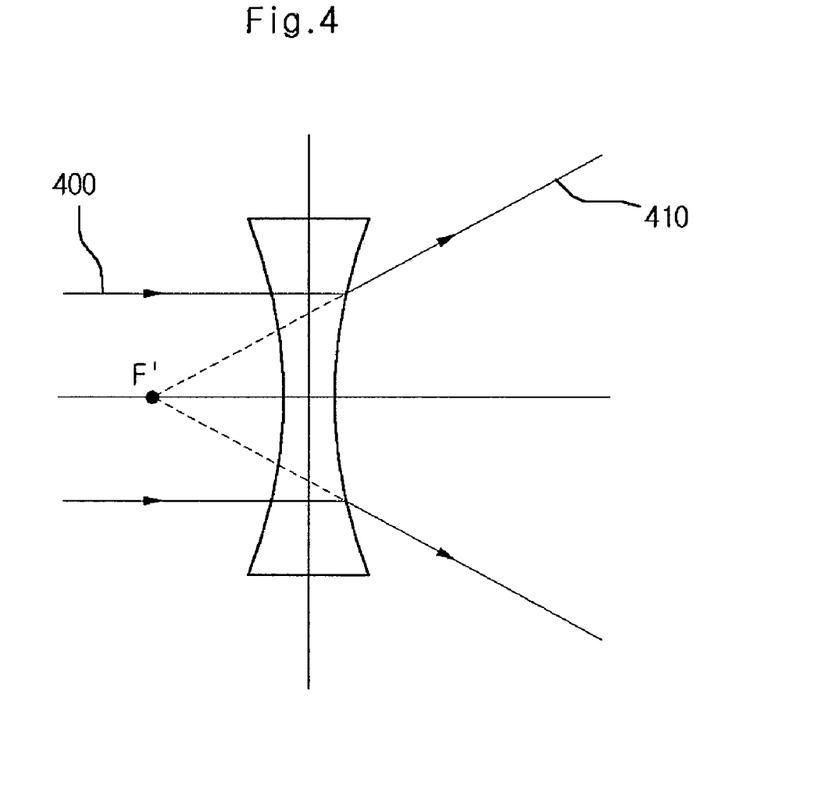
FIG. 4 is a schematic view illustrating refraction of light that is incident into a concave lens.

Snell's law is applied to refraction of light by the structure of the protrusion part having the concavely inclined surface. As a result, the light that is incident into the concavely inclined is refracted in such a manner that the light 400 is widespread from a virtual focus "F," as illustrated in FIG. 4 illustrating refraction of light in a concave lens.

Namely, by concavely forming the inclined surface of the protrusion part provided on the prism sheet, it is possible to refract the light introduced into the prism sheet with a predetermined angle, thereby obtaining uniform optical characteristics in a wide range.

Also, the lamp unit 310 includes a lamp 312 for generating light, and a lamp reflector 314 enclosing the lamp 312. The light generated by the lamp 312 is incident into a light guide plate 320. The lamp reflector 314 reflects the light generated by the lamp 312 toward the light guide plate 320, thereby increasing amount of incident light toward the light guide plate 320, which is like in the general lamp unit.

The light guide unit includes a reflection plate 330, the light guide plate 320, and optical sheets 340. The light guide plate 320 is disposed at one end of the lamp unit 310 to guide the light emitted from the lamp unit 310 such that the light emitted from the lamp unit 310 is incident into the LCD panel.

The reflection plate 330 is disposed beneath the light guide plate 320 and reflects light leaked from the light guide plate 320 toward the light guide plate 320 again.

The plurality of optical sheets 340 are disposed on the light guide plate 320 to enhance efficiency of the light passing through the light guide plate 320. Specifically, the optical sheets 340 include a diffusion sheet 342, a prism sheet 344 and a protection/retardation sheet 346, and are orderly stacked on the light guide plate 320.

The diffusion sheet 342 scatters the light that is incident from the light guide plate 320, thereby making the brightness distribution of the light uniform.

Also, the prism sheet 344 described above the prism sheet is disposed such that the protrusion parts having concavely inclined surfaces face the diffusion sheet 342, as illustrated in FIG. 3A, or is disposed such that the face not having the protrusion parts faces the diffusion sheet 342, as illustrated in FIG. 3B.

In the embodiment illustrated in FIG. 3C, a plurality of protrusion parts 321 are formed on an upper surface of the light guide plate 320', so that about 80% of the light that is incident into the light guide plate 320' is emitted with an angle range of about 60° to 80°.

As illustrated in FIG. 3C, the prism sheet 344 of the present invention is disposed such that the surface where the protrusion parts are formed opposes the diffusion sheet 342 as shown in FIG. 3B. Hence, the light that is incident with the specific angles is refracted in various angles by the concavely inclined surface of the prism sheet 344, so that uniform optical characteristics in a wide range can be obtained.

The retardation sheet 346 disposed on the prism sheet 344 functions not only to protect an upper surface of the prism sheet 344 but also to retard the light that is incident from the prism sheet 344.

In the retreating of the incident light, which is generated by the lamp 312 and passes through the light guide plate 320, the diffusion sheet 342, and the prism sheet 344, the retardation sheet retards or delays one of primary wave (or push wave) and secondary wave (or shake wave) such that one of the primary wave and the secondary wave is converted into the other, thereby enhancing the brightness. It is noted that the retardation sheet may be eliminated, if necessary.

Figure 5:
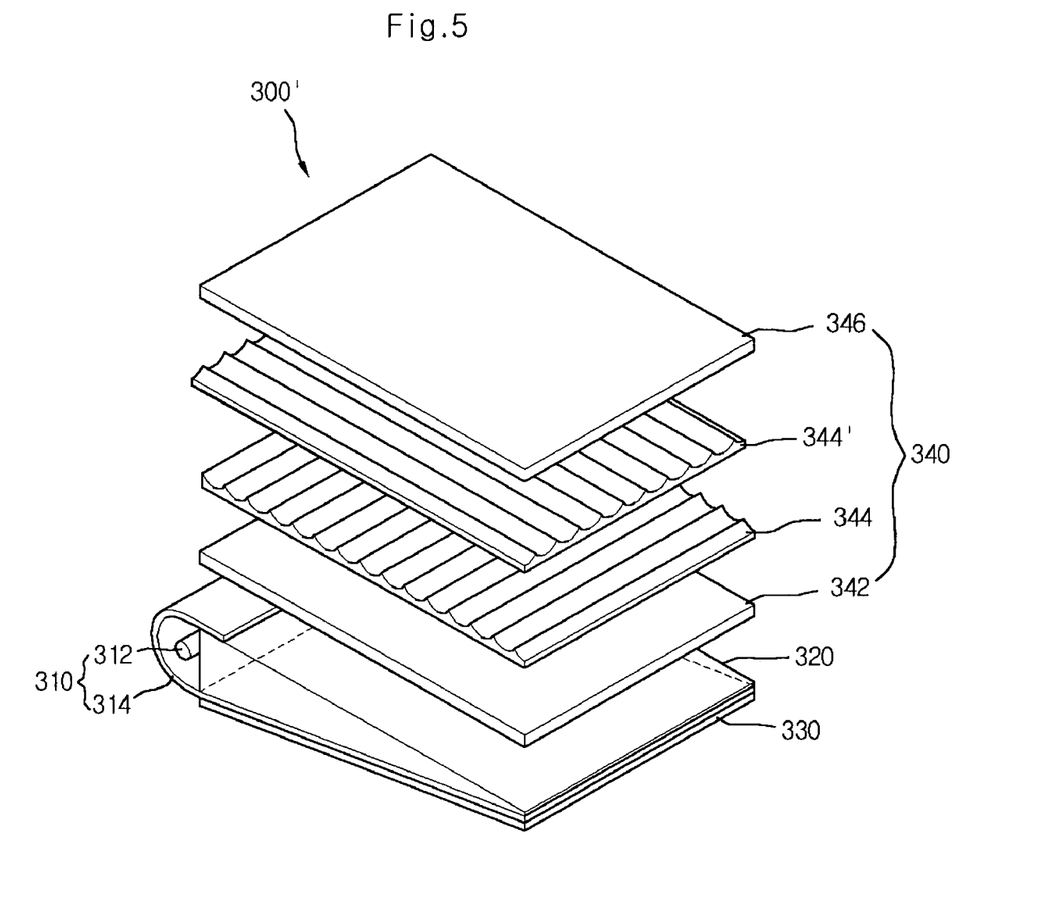
FIG. 5 is a perspective view of a backlight assembly of an LCD according to an embodiment of the present invention.

FIG. 5 is a perspective view of a backlight assembly of an LCD according to an embodiment of the present invention. Wherever possible, the same reference numbers as in FIGS. 3A and 3B will be used throughout FIG. 5 to refer to the same or like parts, and their repeated description will be omitted.

Referring to FIG. 5, a backlight assembly 300' of an LCD according to an embodiment of the present invention is the same in basic constitution as the backlight assembly 300 illustrated in FIGS. 3A and 3B, but is characterized in that two prism sheets 344 and 344' are provided and are arranged such that protrusion parts of the two prism sheets form an offset angle with respect to each other ranging from about 0 degree to 90 degrees. This is to more effectively focus the light diffused by the diffusion sheet 320, thereby enhancing the brightness and viewing angle of the LCD panel.

Although the two prism sheets 344 and 344' illustrated in FIG. 5 are disposed such that their protrusion parts face the diffusion sheet 320, they may be disposed such that the body parts of the prism sheets 344 and 344' face the diffusion sheet 320 as shown in FIG. 3B. Moreover, although not illustrated, a light guide plate as illustrated in FIG. 3C having a plurality of protrusion parts may be incorporated into the configuration of FIG. 5 having two prism sheets.

Figure 6A:
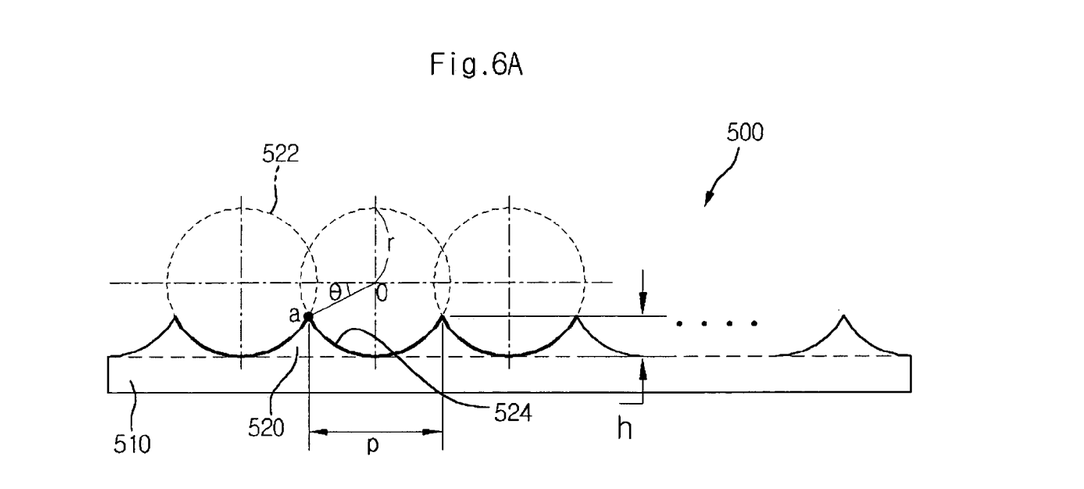
FIGS. 6A and 6B are a sectional view and a perspective view of the prism sheet illustrated in FIG. 3.
Figure 6B:
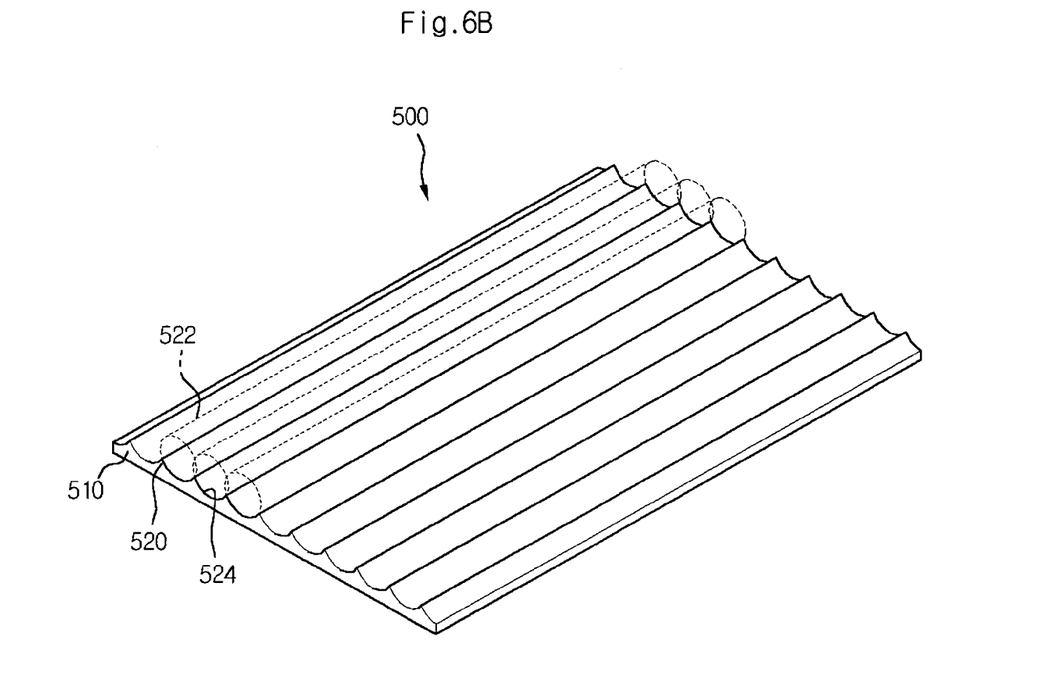

FIGS. 6A and 6B are a sectional view and a perspective view of the prism sheet illustrated in FIG. 3.

Referring to FIGS. 6A and 6B, a prism sheet 500 according to the present invention includes a body part 510 and a plurality of protrusion parts 520 having concavely inclined surfaces 524 formed on an upper surface of the body part 510. The inclined surface 524 of each of the protrusion parts is a substantially circular arc surface formed when two circular cylinders 522 having an equal radius 'r' overlap with each other, and apex point 'a' of the each of the protrusion parts is one of two contact points of the two circular cylinders 522 overlapping with each other, and is located equal to or lower than center 'O' of a cross section of the circular cylinder.

Figure 6C:
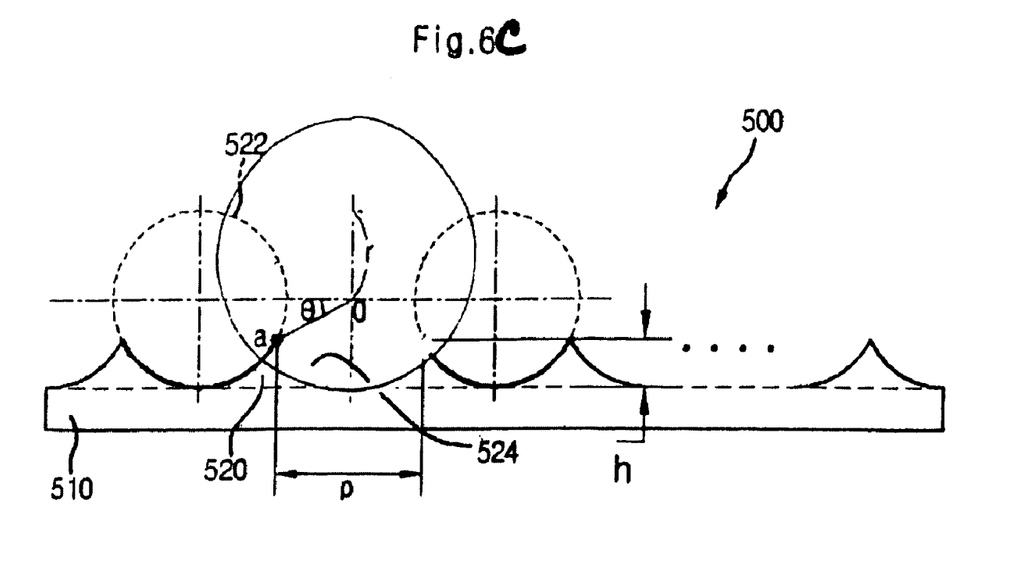
FIG. 6C is a sectional view showing substantially different curvature radii r1 and r2 according to an embodiment of the present invention.

Although FIGS. 6A and 6B exemplarily show that the inclined surfaces 524 are formed by overlapping the two circular cylinders having the equal radius 'r', such a construction is only one embodiment, and accordingly it will be apparent to those skilled in the art that the two circular cylinders 522 may have different radii as shown in FIG. 6C.

The protrusion parts 520 repeatedly form inclined surfaces having an equal curvature along with the circular cylinders 522 having the radius 'r' from the apex points 'a'.

In the above, the circular cylinders 522 are introduced so as to design the shape of the protrusion parts 520, and are not provided on the actual prism sheet.

The plurality of protrusion parts 520 may extend from one end of the body part 510 to the other end of the body part 510 opposing the one end of the body part 510 and are formed in parallel with one another in the stripe form.

Also, it is desirable that the plurality of protrusion parts 520 are formed integrally with the body part 510. In other words, the prism sheet 500 is designed such that one surface of a flat film has the shape of the protrusion parts 520.

As aforementioned, when light is incident into the concavely inclined surfaces 524 of the protrusion parts 520 of the prism sheet 520, the light is refracted in various directions, so that uniform optical characteristics in a wide range can be obtained and a wide viewing angle characteristic can be secured.

In other words, in the related art prism sheet shaped in the triangular prism, as the acute angle α of the apex point is reduced, the brightness increases but the viewing angle decreases. However, in the present invention, due to the acute angle of the apex point 'a', high brightness is obtained and also due to the protrusion structure 520 having the concavely inclined surface 524, incident light can be refracted in various directions so that a wide viewing angle characteristic is obtained.

Again referring to FIG. 6A, when it is assumed that height of each of the protrusion parts 520 is h, an angle between a first line parallel to the flat surface of the prism sheet 510 is 'θ', and a distance between the protrusions 520 is a pitch (p), p is a distance between the adjacent apex points 'a'.

In the present invention, the angle 'θ' ranges between about 0 degree and about 90 degrees, the height 'h' is less than about 300 μm, and the pitch 'p' is less than or equal to r*(cos θ+1). The above definitions may be expressed by equations below:

$$0° \leq \theta < 90°,$$

$$h < 300 \text{ μm, and}$$

$$p \leq r^*(\cos \theta + 1).$$

In conclusion, in the fabrication of the prism sheet of the backlight assembly of the LCD according to the present invention, by adjusting refractive index of the prism sheet material, θ value related with distribution of angles of incident light, radius of circular cylinders, and distance between protrusion parts, it becomes possible to obtain suitable optical characteristics for the brightness and viewing angle.

As described above, according to the inventive backlight assembly of an LCD, inclined surfaces of protrusion parts of the prism sheet are formed in a concave structure, thereby preventing light efficiency from being lowered and securing a wide viewing angle.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly of an LCD, comprising:
a lamp for generating light;
a light guide plate disposed adjacent to the lamp; and
a prism sheet disposed on the light guide plate, wherein the prism sheet comprises a body part and a plurality of uniformly repeating protrusion parts on the body part, the protrusions having opposite first and second concavely inclined surfaces, wherein the first and the second concavely inclined surfaces have curvature radius r1 and curvature radius r2, respectively and the curvature radii r1 and r2 are substantially different and further
wherein the protrusion parts' surfaces are disposed to face the light guide plate.

2. The backlight assembly according to claim 1, wherein the at least one the concavely inclined surface of each of the protrusion part is a circular arc surface.

3. The backlight assembly according to claim 1, wherein each protrusion part includes two concavely inclined surfaces having substantially circular arc surfaces defined by two imaginary substantially circular cylinders having radii (r1) and (r2), respectively, wherein the circular imaginary cylinders substantially overlap with each other, and an apex point (a) of the each of the protrusion parts is one of two contact points of the two imaginary circular cylinders overlapping with each other, and is located substantially equal to or lower than center (O) of a section of the circular cylinder and wherein a center of the curvature radii r1 or r2 is located substantially equal to an apex point (a) of the protrusion parts.

4. The backlight assembly according to claim 1, wherein the plurality of protrusion parts extend from one end of the body part to an opposite end of the body part and are substantially parallel with one another.

5. The backlight assembly according to claim 1, wherein the prism sheet is formed of a transparent resin material.

6. The backlight assembly according to claim 5, wherein the transparent resin material includes one of acryl and polycarbonate.

7. The backlight assembly according to claim 1, wherein a distance (r1) between the adjacent apex points of the protrusion parts is substantially equal to or less than (r1)*(cos θ+1).

8. The backlight assembly according to claim 1, wherein a distance between adjacent apex points of the protrusion parts is substantially equal to or less than $r_2(\cos \theta + 1)$.

9. The backlight assembly according to claim 1, wherein the protrusion has a height less than about 300 μm.

10. The backlight assembly according to claim 1, further comprising a retardation sheet disposed on the prism sheet for retarding the light that is incident from the prism sheet.

11. The backlight assembly according to claim 1, further comprising a diffusion sheet between the light guide and the prism sheet.

12. The backlight assembly according to claim 1, further comprising a diffusion sheet disposed on the prism sheet and facing the body part of the prism sheet.

13. The backlight assembly according to claim 11, wherein the prism sheet is disposed such that the body part faces the diffusion sheet.

14. The backlight assembly according to claim 1, wherein the light guide plate disposed beneath the prism sheet has a plurality of protrusion parts formed on an upper surface thereof.

15. The backlight assembly according to claim 1, wherein the prism sheet comprises two prism sheets each having the protrusion part, which are disposed with an angle with respect to each other ranging from about 0 degrees to about 90 degrees.

16. The backlight assembly of claim 1, wherein the light guide plate has a substantially triangular cross-section.

17. A backlight assembly of an LCD, comprising:
a lamp for generating light;
a light guide plate disposed at a side of the lamp, for guiding the light; and
a diffusion sheet and a prism sheet disposed on the light guide plate, for enhancing efficiency of the light outputted from the light guide plate,
wherein the prism sheet comprises a body part and a plurality of uniformly repeating protrusion parts each having an opposite first and second concavely inclined surfaces formed on the body part, the first concavely inclined surface has curvature radius r1 and the second substantially concavely inclined surface has curvature radius r2, wherein the curvature radii r1 and r2 are substantially different and further;
wherein the protrusion parts of the prism sheet face the light guide plate, wherein the inclined surface of each of the protrusion parts is a substantially circular arc surface formed when two substantially circular cylinders having substantially different radii r1 and r2 substantially overlap with each other, and an apex point (a) of the each of the protrusion parts is one of two contact points of the two substantially circular cylinders substantially overlapping with each other, and is located substantially equal to or lower than center (O) of a section of the substantially circular cylinder wherein a center of the curvature radii r1 or r2 is located substantially equal to an apex point (a) of the protrusion parts.

* * * * *